(12) United States Patent
Chicky

(10) Patent No.: US 7,017,340 B2
(45) Date of Patent: Mar. 28, 2006

(54) HYDROKINETIC TORQUE CONVERTER FOR AN AUTOMATIC VEHICLE TRANSMISSION

(75) Inventor: Joe Chicky, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/711,027

(22) Filed: Aug. 18, 2004

(65) Prior Publication Data

US 2006/0037313 A1   Feb. 23, 2006

(51) Int. Cl.
*F16D 33/00* (2006.01)
(52) U.S. Cl. ......................................... 60/330; 60/339
(58) Field of Classification Search ............... 29/889.5, 29/889.1; 60/330, 339, 358
See application file for complete search history.

(56) References Cited

U.S. PATENT DOCUMENTS

| | | | | |
|---|---|---|---|---|
| 5,211,262 | A * | 5/1993 | Akiyama ..................... 74/467 |
| 5,669,761 | A * | 9/1997 | Kobayashi ................... 417/302 |
| 5,711,408 | A * | 1/1998 | Dick ......................... 192/85 R |
| 6,053,718 | A * | 4/2000 | Schmidt et al. ............. 418/152 |
| 6,276,056 | B1 | 8/2001 | Kolodziej et al. ......... 29/889.5 |
| 6,592,348 | B1 * | 7/2003 | Johnson ..................... 418/171 |
| 2003/0070294 | A1 | 4/2003 | Yamanaka et al. ......... 29/889.5 |
| 2003/0074791 | A1 | 4/2003 | Yamanaka et al. ......... 29/889.5 |
| 2005/0058550 | A1 * | 3/2005 | Becker et al. ................ 417/87 |

* cited by examiner

*Primary Examiner*—Thomas E. Lazo
(74) *Attorney, Agent, or Firm*—David B. Kelley; Brooks Kushman P.C.

(57) ABSTRACT

A hydrokinetic torque converter assembly for use with a geared transmission in a vehicle powertrain. The transmission includes a gear pump with a pump driving member and the torque converter assembly includes an impeller shaft drivably engageable with the pump driving member. The impeller shaft and the pump driving member are configured to effect full driving engagement of the impeller shaft with the pump driving member as the torque converter is assembled with the geared transmission.

6 Claims, 3 Drawing Sheets

HYDROKINETIC TORQUE CONVERTER FOR AN AUTOMATIC VEHICLE TRANSMISSION

BACKGROUND OF THE INVENTION

1. Field of the Invention

The invention relates to a hydrokinetic torque converter and a positive displacement transmission fluid pump for an automatic transmission in a vehicle powertrain.

2. Background Art

Automatic transmissions for automotive vehicles may include multiple ratio planetary gearing in a transmission housing that is secured to an internal combustion engine housing. The gearing defines torque flow paths from the engine to a driven shaft of the transmission. The driven shaft is connected drivably to vehicle traction wheels through a suitable driveline and a differential-and-axle assembly. Typically, a hydrokinetic torque converter is situated within the transmission housing at a location intermediate the engine and the multiple ratio gearing.

The hydrokinetic torque converter includes a bladed impeller connected drivably to a crankshaft of an internal combustion engine. The impeller includes an impeller housing that surrounds a bladed turbine and a bladed stator. The impeller, the turbine and the stator define a torus fluid flow circuit, whereby torus flow developed by the impeller is received by the turbine. Turbine blading changes a tangential fluid flow velocity vector for the torus fluid flow, thus developing turbine torque.

The stator is located between the torus fluid flow exit section of the turbine blades and the flow entrance section of the impeller. The geometry of the blading of the stator changes the tangential velocity vector of the torus flow such that turbine torque relative to the torque of the impeller is enhanced.

The impeller is rotatably supported on an impeller hub shaft journalled in a relatively stationary pump housing that forms a wall of the transmission housing separating the hydrokinetic torque converter from the planetary gearing. A positive displacement gear pump, typically of the internal/external gear rotor type, is situated within the pump housing. A drive gear of the gear rotor pump is splined or otherwise drivably connected to the hub of the impeller. Thus, the torque developed by the engine, which drives the impeller, is effective to drive also the gear rotor pump.

The gearing includes fluid pressure-operated clutches and brakes. In a typical automatic transmission, the clutches and brakes establish and disestablish multiple gear ratios in the transmission gearing. A transmission control valve body controls pressure distribution from the pump to the clutches and brakes, as well as to a transmission lubrication oil system.

Fluid pressure distributor passages for the transmission clutches and brakes and for the lubrication oil system are in communication with the pump housing, and ultimately with a pressure discharge port of the pump. The pump also has a pressure inlet port or suction port that communicates with a fluid supply reservoir, which forms a part of the transmission assembly.

A driving connection between the impeller hub and the driving gear of the gear rotor pump can be a key-and-slot connection, a splined connection, or a connection established by registering flats, typically two diametrically opposed flats formed on the impeller hub shaft. The driving gear of the gear rotor pump may be formed with flats on the inner diameter of a central opening in the driving gear, which register with the flats formed on the impeller hub shaft.

The impeller hub shaft is journalled in the pump housing. The housing, in turn, is fixed to the transmission housing and forms a bearing support wall.

During high volume manufacturing operations for an automotive transmission mechanism, the planetary gearing is assembled in a first assembly step within the transmission housing. The pump housing, in a separate assembly step, is secured to the transmission housing. These assembly steps occur prior to the assembly of the hydrokinetic torque converter between the engine and the transmission bearing support wall.

The torque converter itself is manufactured and assembled as a separate sub-assembly independently of the assembly of the planetary gearing and the gear rotor pump in the bearing support wall. It then is assembled during a final assembly operation within the transmission housing. This requires the impeller hub shaft to be inserted through a bearing opening formed in the bearing support wall. If the driving connection between the impeller hub and the gear rotor pump includes flats formed on the impeller hub and on the driving gear of the gear rotor pump, it is necessary to establish registry between the flats as the impeller hub shaft is advanced through the bearing support wall.

In a subsequent step in a final assembly operation, a flexible drive plate connected to the engine crankshaft is secured to a radially outward portion of the impeller housing. If the flats formed on the impeller hub shaft at the time of final assembly are not in registry with the internal flats formed on the driving gear of the gear rotor pump, a secure driving connection between the impeller and the pump will not be established.

When a transmission is shipped to a vehicle assembly plant, the torque converter is held in place by straps secured to the transmission housing. The straps are removed prior to assembly of the transmission to an engine. It is possible at that point for the impeller hub shaft to become detached from the drive gear of the gear rotor pump. This will cause the drive plate to be flexed when the transmission is assembled to an engine at a vehicle assembly plant, thereby creating an axial force on the impeller and the impeller hub.

In a typical high volume manufacturing operation at a transmission manufacturing plant, an automatic transmission will be assembled to an electric dynamometer and tested prior to delivery of the transmission to an automotive vehicle assembly plant. If testing were to occur on a transmission at the transmission manufacturing plant when the impeller hub shaft is not indexed properly with respect to the drive gear of the gear rotor pump, again a reliable driving connection between the impeller and the gear rotor pump will not be established because of the out-of-registry condition of the flats on the impeller hub and on the driving gear of the gear rotor pump.

Whenever an out-of-registry condition exists, the pump will not develop a pressure required for the clutch and brake elements of the transmission. This will cause malfunctioning of the automatic transmission controls and will result as well in a lack of lubrication oil pressure. This condition can result in a failure of the friction elements of the clutches and brakes, which results in an increased rejection rate and increased manufacturing costs.

SUMMARY OF THE INVENTION

The present invention overcomes the shortcoming of the manufacturing procedure described in the preceding paragraphs by providing a reliable and robust driving connection of the impeller hub shaft with the positive displacement pump wherein the connection comprises registering flats. The invention ensures that external flats formed on the transmission hub are aligned and are fully engaged in registry with internal flats formed on the drive gear of the gear rotor pump when the transmission is assembled to an engine at a vehicle assembly plant or is tested at a test facility in a transmission manufacturing plant.

This objective of the invention is achieved by providing at least one ramped end surface on the hub shaft of the impeller and at least one strategically formed flat on the drive gear of the gear rotor pump. The ramped surface, when the flat on the impeller hub shaft is misaligned with the flat on the drive gear of the gear rotor pump, will cause the drive plate to flex when the transmission housing is secured by bolts to the engine housing. The drive plate acts as a diaphragm spring.

When engine crankshaft torque is developed, the impeller hub will rotate relative to the drive gear of the gear rotor pump as the spring force of the drive plate urges the impeller hub shaft toward an engaged position relative to the drive gear of the gear rotor pump. As torque is applied to the impeller, the flat on the drive gear of the gear rotor pump will traverse the ramp on the impeller hub shaft, thereby moving the impeller hub shaft closer to its fully engaged position with respect to the drive gear of the gear rotor pump. This will cause a driving torque to be applied to the pump, which allows the pump to develop an initial control pressure build-up in the transmission control system and in the transmission lubrication oil passages.

Continued operation of the engine will result in full registry of the flat formed on the drive gear of the gear rotor pump with respect to the flat formed on the impeller hub shaft. When full alignment between the flats is established, the spring force on the drive plate will cause the impeller hub shaft to snap fully into driving registry with respect to the drive gear of the gear rotor pump. Thereafter, the gear rotor pump will operate normally and will be able to develop full control valve circuit pressure and full lubrication oil pressure, which avoids a wear problem for the friction elements of the clutches and brakes, as previously described.

In addition to the foregoing advantages for quickly developing full circuit pressure during the initial moments of a final powertrain test procedure, the elements of the gear rotor pump itself will be lubricated, thereby avoiding metal-to-metal contact between the pump elements and the wall of the pump chamber in the pump housing. This avoids damage to the pump elements.

The protection of the moving gear rotor pump elements is another objective of the invention. This feature, together with the feature that protects the friction elements of the transmission clutches and brakes, also improves the manufacturing efficiency in the transmission assembly plant and avoids undesirable transmission rejection rates.

It is still another objective of the invention to provide a high axial dimensional tolerance at the driving connection between the impeller hub shaft and the drive gear of the gear rotor pump. This will permit axial movement of the impeller hub shaft of the impeller as the impeller housing is rotated by the engine, both during the final testing step of the manufacturing process as well as during subsequent use of the transmission in an automotive vehicle powertrain. This feature will compensate for a so-called ballooning effect for the impeller housing when the converter is rotated at relatively high speeds and a significant centrifugal pressure is developed in the impeller housing. The driving connection established by the registering flats on the impeller hub shaft and on the drive gear of the gear rotor pump will accommodate axial movement on the impeller hub shaft due to the ballooning effect.

DETAILED DESCRIPTION OF THE PREFERRED EMBODIMENT (S)

Figure 1:
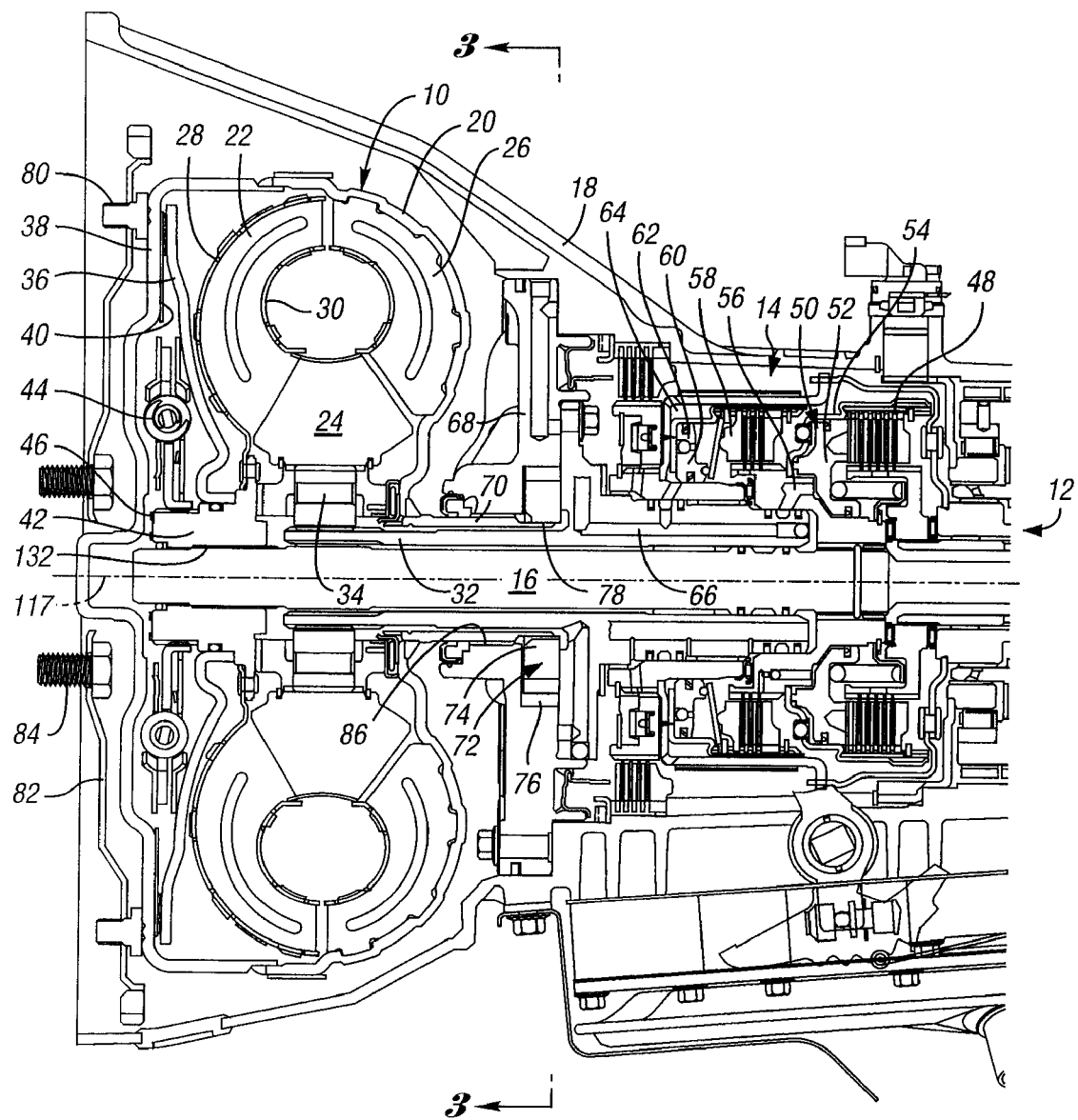
FIG. 1 is a cross-sectional view of a portion of an automatic transmission assembly for an automotive vehicle that includes planetary gearing and a hydrokinetic torque converter located in separate regions of a transmission housing, the regions being separated by a bearing support wall that defines a gear rotor pump housing.

A torque converter transmission for an automotive vehicle is illustrated partially in cross-section in FIG. 1. It comprises a bladed hydrokinetic torque converter 10, transmission gearing 12, and a friction clutch-and-brake assembly 14 for establishing and disestablishing torque flow paths through the gearing 12 from a torque converter turbine shaft 16. The converter 10, the gearing 12 and the friction clutch-and-brake assembly 14 are situated in a transmission housing 18, which is bolted or otherwise secured to an engine (not shown) in a vehicle powertrain.

The converter 10 comprises a bladed impeller housing 20, a bladed turbine 22, and a bladed stator 24. The impeller housing 20 encloses turbine 22 and stator 24.

Impeller blades 26 are secured to the interior of the impeller housing 20. Turbine 22 includes an outer shroud 28 and an inner shroud 30. Turbine blades are secured to the shrouds 28 and 30 in known fashion. The turbine blades and impeller blades 26 define a toroidal fluid flow circuit in known fashion. Hydrokinetic fluid circulates from the exit section of the impeller blades and enters the entrance section of the turbine blades, creating a torque on the turbine as the direction of flow of fluid through the turbine blades is changed in a tangential direction. Torus flow exits the turbine blades and enters the stator, which is formed with blades that redirect the tangential direction of the torus flow before the flow enters the entrance section of the impeller blades 26. The torque reaction on the stator created by the change of tangential direction of the torus flow through the stator creates a reaction torque that is distributed to a stationary stator shaft 32 through overrunning coupling 34.

The impeller housing encloses a friction disc lock-up clutch plate 36, which is formed with a friction surface on its outer periphery. The friction disc plate 36 frictionally engages the forward wall 38 of the impeller housing.

A clutch plate 40 is secured to a turbine hub 42 by a torsional damper assembly 44. The damper assembly is splined at 46 to the turbine hub 42.

The clutch and brake assembly 14 comprises multiple pressure-operated actuators. The actuator for a forward drive friction clutch assembly 48 is shown at 50. It comprises an annular piston 52 located in an annular cylinder 54. Fluid pressure is delivered to the pressure chamber defined by the piston 52 and the cylinder 54 through internal passages, shown in part at 56.

An intermediate clutch disc assembly 58 is actuated by a fluid pressure actuator 60, which comprises an annular piston 62 situated in an annular cylinder formed by clutch drum 64. Fluid pressure is supplied to the pressure chamber defined by the piston 60 and the clutch drum 64 through internal passages, shown in part at 66.

A bearing support wall and pump housing is shown at 68. It is secured to an internal shoulder formed in the transmission housing 18. An impeller hub shaft 70 is journalled in a bearing opening formed in the wall 68.

Wall 68 defines a pump housing for positive displacement gear pump 72, which will be described subsequently with reference to FIGS. 2a, 2b, 2c and 3. The pump 72 comprises a first pump element 74 with external involute teeth 94 and a second pump element 76 with internal involute teeth, which engage the external involute teeth 94 of gear pump element 74.

The impeller hub is connected drivably to the gear pump element 74 by means of a driving connection shown at 78 in FIG. 1.

The impeller housing 20 is connected drivably at 80 to a drive plate 82, which is bolted or otherwise drivably connected to the crankshaft of the engine, suitable drive bolts 84 being provided for this purpose.

The positive displacement gear pump 72 creates a control pressure for the clutch-and-brake assembly 14 as the pump is driven by the impeller housing 20. The driving connection at 78 is comprised of at least one flat that registers with a flat formed on the externally-toothed pump gear when the hub shaft 70 is drivably engaged with the pump.

During assembly of the transmission, the torque converter is assembled as a separate sub-assembly. When the transmission gearing and the transmission clutch-and-brake assembly are fully assembled, the torque converter is matched to the sub-assembly that comprises the gearing and the clutch-and-brake assembly. The impeller hub shaft 70, during this assembly procedure, must be inserted through central opening 86 formed in the wall 68. If the driving flat on the hub shaft 70 is misaligned with respect to the flat formed in the externally-toothed pump element 74, a driving connection between the impeller and the positive displacement pump will not be established.

If misalignment exists when the transmission is assembled to an engine, the drive plate 82 will yield as it acts as a diaphragm spring. An axial force then will be created on the impeller hub. It is not possible to determine, during this part of the assembly procedure, whether the impeller hub shaft 70 is fully engaged with the gear pump. If the completed transmission then is tested with an engine during a final test procedure, the impeller and the impeller hub shaft 70 will not be drivably connected to the pump and the flats formed on the hub shaft 70 will ratchet over the flats formed on the externally-toothed pump element 70. When this occurs, the gear pump will be incapable of developing a control pressure to pressurize the pressure-actuated clutch and brake actuators. As long as this condition exists, the friction elements of the clutch and brake assembly will not fully be lubricated and premature clutch and brake failure may occur. The present invention will prevent this condition from occurring.

Figure 3:
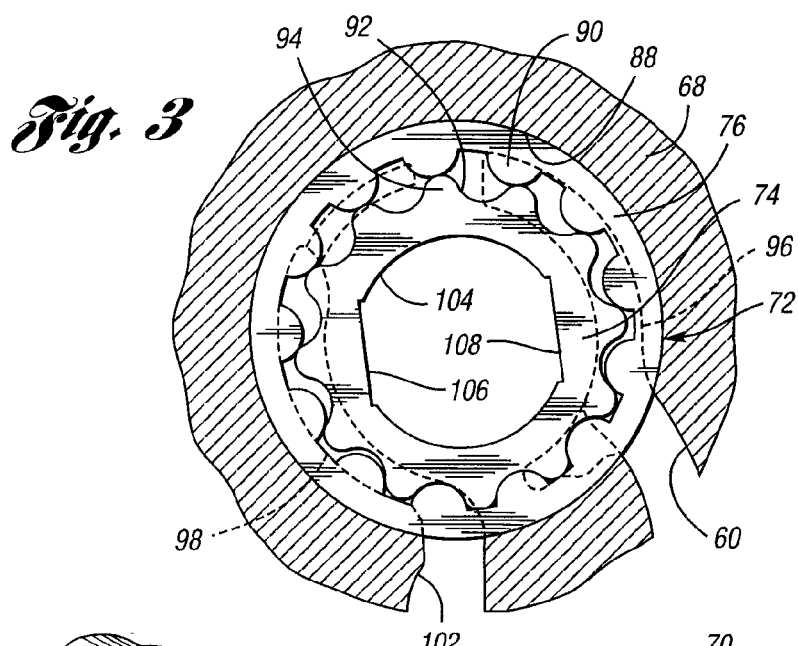
FIG. 3 is a view of an assembled gear rotor pump, as seen from the plane of section line 3—3 of FIG. 1, showing the external teeth of the drive gear registering with the internal teeth of the driven gear of the gear rotor pump.

The pump 72 is viewed in FIG. 3 from the plane of section line 3—3 of FIG. 1. The outer pump member 76 is rotatably supported in a pump cavity 88 formed in wall 68. Internal teeth 90 of the outer pump member 76 register with tooth spaces 92 between external pump gear teeth 94 of the internal gear pump element 74. As is well known in the art, the inner pump member of the gear pump of FIG. 3 is positioned eccentrically with respect to the axis of the outer pump member 76. This eccentricity defines a plurality of pumping chambers, which register with fluid intake port 96 and fluid outlet port 98. These ports communicate, respectively, with fluid supply passage 100 and high pressure fluid delivery passage 102.

Figure 2A:
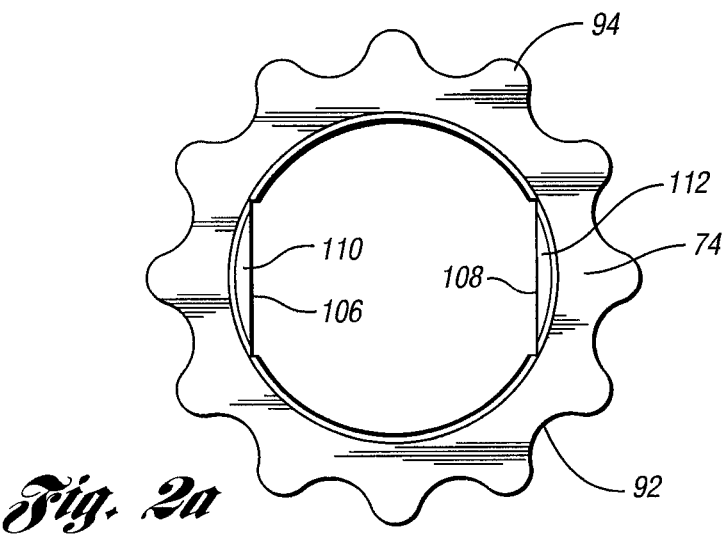
FIG. 2a is an end view of the external gear element of a gear rotor pump, the gear rotor pump being shown in cross-section in FIG. 1.
Figure 2B:
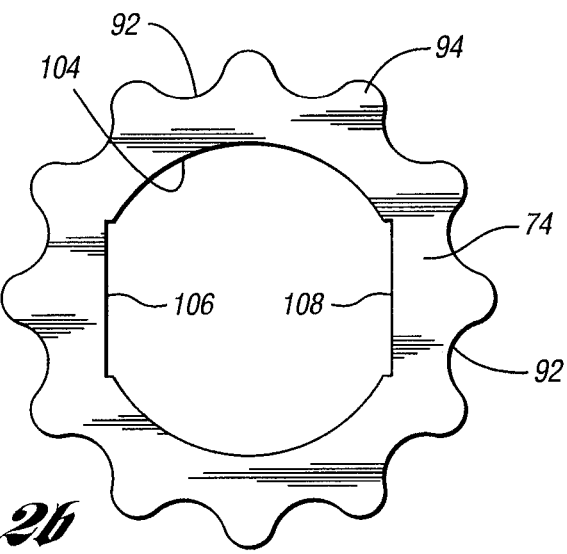
FIG. 2b is a view of the pump element of FIG. 2a as seen from the opposite side of the gear element.
Figure 2C:
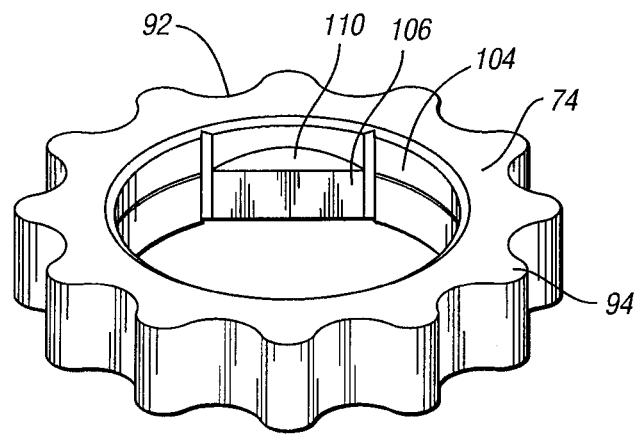
FIG. 2c is an isometric view of the external gear element shown in FIGS. 2a and 2b.

As best seen in FIGS. 2a, 2b and 2c, the gear pump element 74 is formed with a circular opening 104, which encircles the impeller hub shaft 16. Diametrically opposed flats 106 and 108 are formed in the opening 104. The axial thickness of the flats 106 and 108, as best seen in FIG. 2c, may be approximately ½ the axial thickness of the gear pump element 74. A flat surface 110 is formed on the inner periphery of the gear pump element 74. A similar flat surface is formed adjacent flat 108 on the inner periphery of the gear pump element 74. This is indicated at 112 in FIG. 2a, but it is not visible in FIG. 2c.

Figures 4, 5:
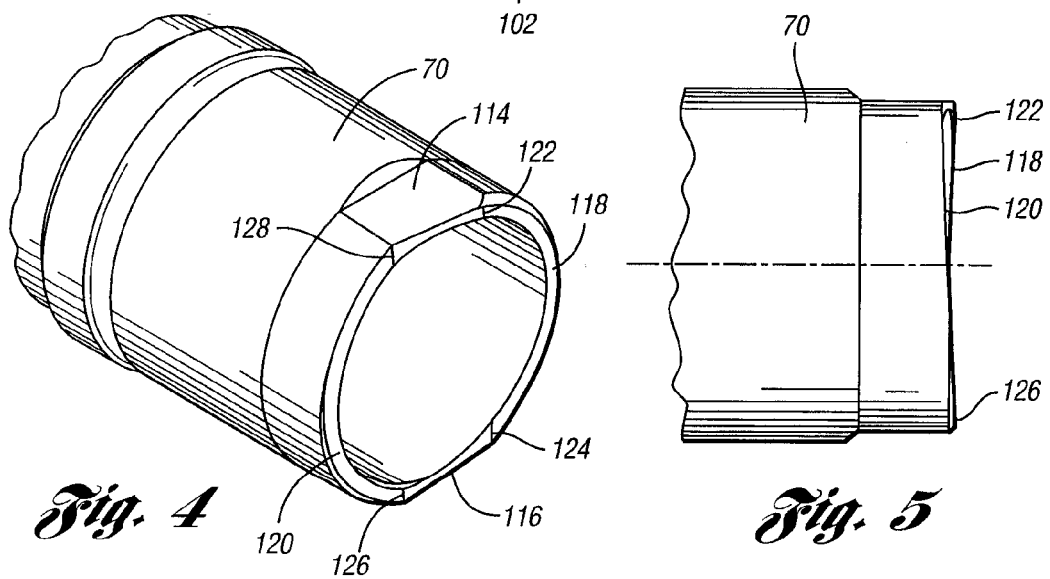
FIG. 4 is an isometric view of the hub of the torque converter illustrated in FIG. 1.
FIG. 5 is a side view of the hub shown in FIG. 4.
Figure 6:
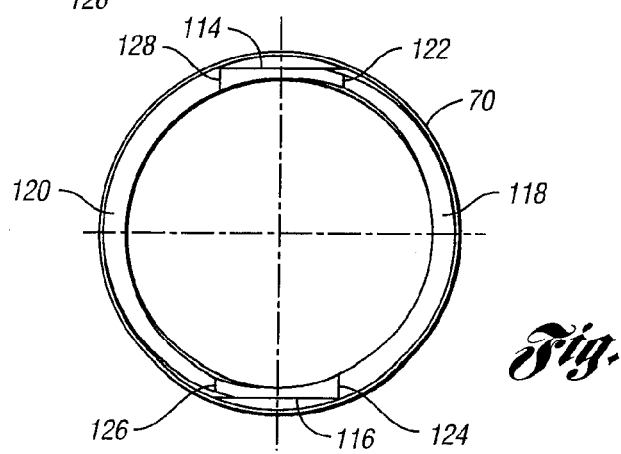
FIG. 6 is an end view of the hub shown in FIG. 4.

The impeller hub shaft 70, shown in cross-section in FIG. 1, is shown in more detail in FIGS. 4, 5 and 6. The impeller hub shaft 70 is a cylindrical sleeve shaft received over stationary stator sleeve shaft 32, seen in FIG. 1. The right-hand end of the impeller hub shaft 70 is formed with a pair of flats 114 and 116, which are situated 180E apart with respect to the centerline 117 for the transmission, as viewed in FIG. 1. When the torque converter sub-assembly is assembled to the transmission, the impeller hub shaft 70 is received in the opening 104 of the internal gear pump element 74. The flat 106 formed in the central opening of the gear pump element 74 registers with flat 114 formed on the impeller hub shaft 70. Likewise, flat 108 formed on the pump gear element 74 registers with flat 116 on the impeller hub shaft 70. This registry of the flats establishes a driving connection between the impeller and the gear pump element 74 of the positive displacement gear pump 72.

The right-hand end of impeller hub shaft 70 is provided with ramp surfaces 118 and 120. Ramp surface 118 slopes to the left, as seen from the vantage point of FIG. 5 from a high point at 122 to a low point at 124. Point 122 corresponds to the location of one end of the flat 114 and point 124 corresponds to one end of the flat 116. When viewed in FIG. 4, the ramped surface 118 thus slopes downwardly from point 122 to point 124. At point 124, the ramped surface 118 blends with the surface of the flat 116.

The other end of the flat 116, identified as point 126, is the high point for the ramped surface 120. The ramped surface 120 slopes downwardly, as seen from the vantage point of FIG. 4, to point 128, where it blends with flat 114.

When the impeller hub shaft 70 is inserted into the opening 104 in the gear pump element 74, the sloping surfaces 118 and 120 will engage the flat surfaces 110 and 112 on the pump gear element 74. If the converter 10 is being assembled to the planetary gear system and the impeller sleeve shaft 70 is not be fully engaged with the gear pump element 74, the clutch plate 36 then will flex. If the complete transmission assembly, including the gearing and the torque converter, then is tested with drive plate 82 connected to the crankshaft of an engine, the impeller housing 20 will be rotated by the engine and turbine torque will be developed. That torque is transferred to the turbine hub 42 and to turbine shaft 16, which is splined to the hub 42, as shown at 132. Turbine torque then will be delivered to the friction elements of the clutch-and-brake assembly in the gearing system, but pump 72 is not capable of delivering pressure until the flats 114 and 116 engage, respectively, flats 106 and 108 on the gear pump element 74.

Since the surfaces 108 and 110 are engaged with the ramped surfaces 118 and 120, relative rotary motion of the impeller hub shaft 70 with respect to the gear pump element 74 will cause the flats 106 and 108 to move down their respective ramped surfaces 118 and 120. This permits a partial engagement of the impeller hub shaft 70 with the pump gear element 74. When relative motion of the hub shaft 70 with respect to the gear pump element 74 continues, the flats 106 and 108 will become aligned with respect to flats 114 and 116. The spring force that is developed by reason of the deflection of the drive plate 82 then will cause the shaft 70 to snap into full engagement with the gear pump element 74. The flats on the impeller hub shaft 70 then are in full registry with the flats 106 and 108, respectively, on the gear pump element 74. The pump 72 then develops full pressure. Damage to the friction elements due to lack of control pressure developed by the pump is avoided. Also, sufficient lubrication pressure is provided at the instant the testing of the transmission begins, which protects the bearings in the gearing system.

The invention is capable of reducing transmission warranty costs and premature transmission friction element failures because it avoids a condition in which torque is being distributed through the gearing without adequate pressure being developed by the pump 72.

As seen in FIG. 1, the right-hand end of the impeller hub shaft 70 is axially spaced from the housing for the gear pump 72. This spacing makes it possible for the impeller hub shaft 70 to shift slightly in a right-hand direction when the torque converter is operated at high speeds. Such high speed operation will develop a centrifugal pressure in the torus circuit of the torque converter, which may result in a so-called ballooning or expansion of the axial dimension of the impeller housing. Compensation for this so-called ballooning effect of the impeller housing is readily accommodated without interfering with the operation of the gear pump 72. The driving connection between the impeller hub shaft 70 and the gear pump element 74 will accommodate axial sliding movement of the sleeve shaft 70 relative to the pump gear element 74 without interfering with the driving connection between the gear pump element 74 and the shaft 70.

Although an embodiment of the invention has been disclosed, it will be apparent to persons skilled in the art that modifications may be made without departing from the scope of the invention. All such modifications and equivalents thereof are intended to be covered by the following claims.

What is claimed is:

1. A hydrokinetic torque converter assembly for use with an engine in an automatic transmission in an automotive vehicle powertrain, the transmission having friction couplings with pressure-operated actuators, the converter assembly comprising:

an impeller in a closed impeller housing;

a turbine and a stator in the impeller housing, the turbine being connected drivably to a torque output turbine shaft; and a positive displacement pump having a pump drive member, the actuators being in controlled fluid pressure communication with the pump, the pump drive member having a central opening;

the impeller including an impeller hub defined by an impeller sleeve shaft surrounding the turbine shaft;

at least one internal flat in the central opening in the pump drive member and at least one external flat on the impeller sleeve shaft, the internal flat having a side surface in axial alignment with an end of the impeller sleeve shaft when the pump drive member surrounds the impeller sleeve shaft and the internal flat is out of registry with respect to the internal flat;

the end of the impeller sleeve shaft being sloped from a first point on the impeller sleeve shaft end to a second point on the impeller sleeve shaft end, the second point being axially spaced relative to the first point;

the side surface of the internal flat being engageable with the sloped end of the impeller sleeve shaft, whereby the internal flat moves relative to the impeller sleeve shaft toward engagement with the external flat as the impeller sleeve shaft enters the central opening of the pump drive member and whereby a driving connection is established between the impeller and the pump when the internal and external flats are in registry.

2. The torque converter assembly as set forth in claim 1, wherein the impeller housing is connected to the engine by a yieldable drive plate;

the drive plate applying a spring force on the impeller sleeve shaft as the drive plate deflects when the torque converter is assembled with the internal flat misaligned with respect to the external flat.

3. The torque converter assembly as set forth in claim 2, wherein the impeller sleeve shaft has two external flats and the central opening in the pump driveshaft has two internal flats;

the end of the impeller having two peripheral sloped segments, one sloped segment being engageable with a side surface of one internal flat and the other sloped segment being engageable with a side surface of the other internal flat;

rotary motion of the impeller sleeve shaft relative to the pump drive member being accompanied by axial movement of the impeller sleeve toward the pump drive member as the side surfaces of the internal flats traverse the sloped segments, whereby driving engagement of the impeller sleeve shaft and the pump drive member is established when the internal and external flats are in registry.

4. The torque converter assembly as set forth in claim 2, wherein the positive displacement pump comprises an internal gear member rotatably supported in a housing portion of the transmission and the pump drive member is an external gear member, the internal and external gear members having eccentric axes of rotation, whereby tooth spaces between the gear members define in part pump inlet and outlet ports.

5. The torque converter assembly as set forth in claim 1, wherein the impeller sleeve shaft has two external flats and the central opening in the pump driveshaft has two internal flats;

the end of the impeller having two peripheral sloped segments, one sloped segment being engageable with a side surface of one internal flat and the other sloped segment being engageable with a side surface of the other internal flat;

rotary motion of the impeller sleeve shaft relative to the pump drive member being accompanied by axial movement of the impeller sleeve shaft toward the pump drive member as the side surfaces of the internal flats traverse the sloped segments, whereby driving engagement of the impeller sleeve shaft and the pump drive member is established as the internal and external flats are aligned in registry.

6. The torque converter assembly as set forth in claim 1, wherein the positive displacement pump comprises an internal gear member rotatably supported in a housing portion of the transmission and the pump drive member is an external gear member, the internal and external gear members having eccentric axes of rotation, whereby tooth spaces between the gear members define in part pump inlet and outlet ports.

* * * * *